United States Patent [19]

Szekely

[11] Patent Number: 5,139,764
[45] Date of Patent: Aug. 18, 1992

[54] SULFUR RECOVERY PROCESS FOR AMMONIA-CONTAINING FEED GAS

[75] Inventor: Andrew G. Szekely, Yorktown, N.Y.

[73] Assignee: Union Carbide Industrial Gases Technology Corporation, Danbury, Conn.

[21] Appl. No.: 708,009

[22] Filed: May 24, 1991

Related U.S. Application Data

[63] Continuation of Ser. No. 471,973, Jan. 29, 1990, abandoned, which is a continuation-in-part of Ser. No. 146,721, Jan. 21, 1988, abandoned.

[51] Int. Cl.$^5$ .................. C01B 17/04; F23C 9/06; F23D 14/32
[52] U.S. Cl. ................ 423/574 R; 422/160; 431/9
[58] Field of Search .......... 423/542, 574 R; 431/8, 431/9, 2, 23, 160, 356; 422/160, 161

[56] References Cited

U.S. PATENT DOCUMENTS

| | | | |
|---|---|---|---|
| 2,043,084 | 6/1936 | Ward et al. | 423/574 R |
| 3,681,024 | 8/1972 | Hujsak et al. | 423/574 R |
| 3,822,341 | 7/1974 | Smith | 423/574 R |
| 3,877,879 | 4/1975 | Palm et al. | 423/574 R |
| 4,038,036 | 7/1977 | Beavon | 423/574 R |
| 4,101,642 | 7/1978 | Tippmer | 423/574 R |
| 4,138,473 | 2/1979 | Gieck | 423/574 R |
| 4,153,674 | 5/1979 | Verloop et al. | 423/574 R |
| 4,279,882 | 7/1981 | Beavon | 423/574 R |
| 4,287,857 | 9/1981 | Schnitzer | 431/9 |
| 4,394,119 | 7/1983 | Waller et al. | 423/574 R |
| 4,395,390 | 7/1983 | Desgrandchamps et al. | 423/574 R |
| 4,411,616 | 10/1983 | Neumann | 431/2 |
| 4,426,369 | 1/1984 | Palm | 423/574 R |
| 4,878,829 | 11/1989 | Anderson | 431/187 |
| 4,933,163 | 6/1990 | Fischer et al. | 423/415 A |
| 5,022,332 | 6/1991 | Ding | 110/346 |

FOREIGN PATENT DOCUMENTS

| | | | |
|---|---|---|---|
| 119391 | 9/1979 | Japan | 423/542 |
| 6 | 1/1983 | Japan | 431/356 |
| 8501901 | 2/1986 | Netherlands | 423/574 R |
| 2187444 | 9/1987 | United Kingdom | 423/574 R |

OTHER PUBLICATIONS

Lieberman, "Modifications Jump Sulfur Recovery Plant Capacity", Oil & Gas Journal, 8-20, 1984, pp. 108-112.

Primary Examiner—Jeffrey E. Russel
Attorney, Agent, or Firm—Stanley Ktorides

[57] ABSTRACT

Ammonia-containing sour gas is combusted at high flame temperature with at least 90 percent purity oxygen in an externally cooled combustor, the ammonia-free product is cooled, then, in conjunction with additional acid gas which does not contain ammonia, is passed to a Claus furnace wherein less than one-third of the hydrogen sulfide is combusted with oxygen enriched air enabling boosting sulfur recovery in a Claus plant without detrimental effects on catalyst life, furnace refractories and pressure drops.

13 Claims, 2 Drawing Sheets

SULFUR RECOVERY PROCESS FOR AMMONIA-CONTAINING FEED GAS

This application is a continuation of prior U.S. application Ser. No. 471,973, filed Jan. 29, 1990, now abandoned, which is a continuation-in-part of application Ser. No. 146,721, filed Jan. 21, 1988, now abandoned.

TECHNICAL FIELD

This invention relates generally to the field of Claus sulfur recovery wherein an ammonia-containing gas is available as a feed.

BACKGROUND ART

The Claus process is widely used to produce sulfur from acid gas and other gases containing hydrogen sulfide. In the modified Claus process feed gas containing hydrogen sulfide is partially combusted with air to form sulfur dioxide. The uncombusted hydrogen sulfide reacts with sulfur dioxide forming sulfur and water in a reaction furnace. The reaction stream is cooled and the sulfur is condensed and recovered. The reaction stream is then passed through one or more catalytic converters wherein additional sulfur is produced in these catalytic stages by the reaction of previously unreacted hydrogen sulfide with sulfur dioxide.

Claus sulfur recovery plants are often employed in petroleum refineries to recover sulfur from waste gas streams as a commercially utilizable product and to reduce air pollution. Sulfur is present in the waste gases in the form of hydrogen sulfide at various concentrations. In the majority of the refineries, the hydrogen sulfide content of the gas is increased by treatment with suitable selective absorbents, such as variously formulated amine based solvents. The principal function of the Claus plant at a petroleum refinery is to convert the hydrogen sulfide content of this more concentrated acid gas stream, which is also referred to as amine gas, to sulfur.

In addition to the acid gas, refineries also have to cope with other environmentally hazardous waste streams. One of such streams is the gas effluent of a sour water stripper. This, so called sour water stripper gas, usually contains ammonia, hydrogen sulfide and water in approximately equal proportions. It is desirable to process such a gas in order to recover the additional sulfur contained therein while simultaneously eliminating an environmentally hazardous by-product. Unfortunately, passing sour water stripper gas in conjunction with acid gas through a Claus sulfur recovery plant present significant operating difficulties.

Major operational difficulties are experienced downstream of the reaction furnace if the ammonia content of the sour water stripper gas is not completely destroyed in the combustion zone of the reaction furnace. Residual ammonia in the Process stream forms undesirable compounds with sulfur, which upon cooling, precipitate solid salts, such as polysulfides of ammonia. The solid salt leads to premature catalyst deactivation in the converters, plugs the process lines and may interfere with the draining of sulfur from the sulfur condenser. Since sulfur vapor is always present in the process stream, the formation of the undesirable ammonia compounds can be prevented only by the upstream destruction of the ammonia.

For an assured destruction of ammonia in a Claus reaction furnace, the thermodynamic and kinetic conditions required for the elimination of this compound would have to be reconciled with the main functional requirement of the reaction furnace, which is to optimize conditions for sulfur production by the Claus reaction. The oxidative destruction of ammonia is favored by high temperatures and high oxygen partial pressures. These requirements cannot be optimized sufficiently in the combustion zone of a conventional Claus reaction furnace if an acid gas is also concurrently combusted in the same combustion zone. The temperature in this combustion zone is constrained by the temperature tolerance of the refractories and the air supply has to be regulated strictly according to the stoichiometric requirement of the Claus reaction, i.e., to combust about one third of the hydrogen sulfide to sulfur dioxide to produce a hydrogen sulfide/sulfur dioxide ratio of about 2. Furthermore, the combustion products of the acid gas and the nitrogen introduced with the supplied air dilute the atmosphere in the combustion zone, reduce the partial Pressure of oxygen for the combustion of the ammonia and can lead to the escape of uncombusted ammonia just by incomplete mixing.

A further obstacle which usually prevents co-Processing sour water stripper gas with acid gas in a Claus sulfur recovery plant is Presented by flow rate restrictions or by limited air blower capacity. The flow rate of the process stream passing through the sulfur recovery plant would increase more than in direct proportion to the additional sour gas input. The increased flow rate can lead to excessive pressure drops and unacceptable pressures in the plant. The unproportional increase in the flow rate is indirectly due to the relatively high oxygen requirement of processing sour water stripper gas, since with each mole of oxygen required for the full combustion of the ammonia and for the partial combustion of the hydrogen sulfide contained therein, about four moles of nitrogen is also introduced into the system from the combustion air. A fully loaded plant, i.e., one which is processing acid gas close to its full flow capacity, cannot recover sulfur from additional sour water stripper gas even if the problems associated with the presence of ammonia in this gas were solved.

It is known in the art that the throughput capacity of a Claus plant can be increased by oxygen enrichment or by the complete replacement of the combustion air with technically pure oxygen. It is also known that an increase in the oxygen concentration of the oxidant increases the flame temperature and, depending on the composition of the feed, may lead to excessive temperatures which can damage the refractories in the reaction furnace. It has been suggested to solve the problem of excessive combustion zone temperatures by recycling a portion of the downstream flow back to the combustion zone to dilute the combustion zone reactants and consequently reduce the combustion temperature. For example, U.S. Pat. No. 3,681,024-Hujsak et al. teaches recycling a portion of the gas effluent from the downstream sulfur condenser(s) to the combustion zone and U.S. Pat. No. 4,552,747 - Goar teaches recycling a portion of the gas effluent from the first sulfur condenser to the combustion zone.

Other temperature moderating additives which have been used or proposed for use in the combustion zone of the Claus reaction furnace include liquid water, liquid sulfur and liquid sulfur dioxide. Temperature moderation is achieved by the absorption of some of the heat released in the combustion zone by the temperature moderating additive.

These temperature moderation processes permit boosting plant capacity by the use of oxygen. However, none of them remove the kinetic constraint imposed on the combustion of ammonia by the operating environment of the combustion zone of a Claus reaction furnace. The combustion temperature is still limited by the furnace refractories and the combustion zone atmosphere is diluted by the combustion products of the acid gas, by a recirculated gas or another temperature moderating additive. Furthermore, a temperature moderating additive introduced into the reaction furnace increases the flow rate through the thermal stage of a Claus plant and, unless the additive is removed from the process stream before the catalytic stages, increases the pressure drop through the entire plant.

Because of these difficulties, ammonia-containing sour gas streams have heretofore generally been disposed of by incineration or by other methods, such as by pumping a concentrated condensate of the gas into the ground, without further processing. This has had the twin disadvantages of the loss of the sulfur contained in such sour gas and the environmental detriment caused by the disposal of hazardous materials. Thus it is very desirable to have a process which would enable the efficient processing of an ammonia-containing sour gas for sulfur recovery in a modified Claus plant.

Accordingly, it is an object of this invention to provide a process wherein an ammonia-containing sour gas may be processed in a modified Claus plant without premature deactivation of the catalyst by ammonia compounds.

It is another object of this invention to provide a process wherein an ammonia-containing sour gas may be processed in a fully loaded Claus plant in addition to acid gas without increasing the pressure drops throughout the plant.

It is a further object of this invention to provide a process wherein an ammonia-containing sour gas may be processed in a modified Claus plant while maintaining a non-excessive temperature in the combustion zone of the Claus reaction furnace.

SUMMARY OF THE INVENTION

The above and other objects which will become apparent to one skilled in the art upon a reading of this disclosure are attained by this invention which is:

A process for producing sulfur comprising:
- (A) introducing a first feed gas containing ammonia and hydrogen sulfide into a first combustion zone having a heat conducting enclosure suitable for extracting heat by an external coolant;
- (B) introducing less than a stoichiometric amount of first oxidant containing at least 90 percent oxygen into the first combustion zone;
- (C) combusting substantially all of the ammonia and part of the hydrogen sulfide in said first feed gas with the first oxidant within the first combustion zone to produce combustion reaction products substantially free of ammonia and of nitrogen oxides, while extracting at least 25 percent of the heat generated by this combustion by indirect heat exchange between the combustion reaction products and the external coolant;
- (D) passing the combustion reaction products from the first combustion zone and further cooling the combustion reaction products;
- (E) introducing combustion reaction products, second oxidant and a second feed gas containing hydrogen sulfide but containing no ammonia into a second combustion zone;
- (F) partially combusting hydrogen sulfide with second oxidant in the second combustion zone to produce sulfur dioxide;
- (G) reacting sulfur dioxide and hydrogen sulfide to produce sulfur;
- (H) recovering sulfur as product; and
- (I) passing unreacted sulfur dioxide and hydrogen sulfide to at least one catalytic reaction zone for the further production of sulfur.

As used herein, the term "indirect heat exchange" means the bringing of two fluids into heat exchange relation without any physical contact or intermixture of the fluids.

As used herein, the term "external coolant" means a fluid coolant which does not physically contact the combustion reactants or the combustion reaction products within the first combustion zone.

DETAILED DESCRIPTION

The process of this invention will be described in detail with reference to the Drawings.

Figure 1:
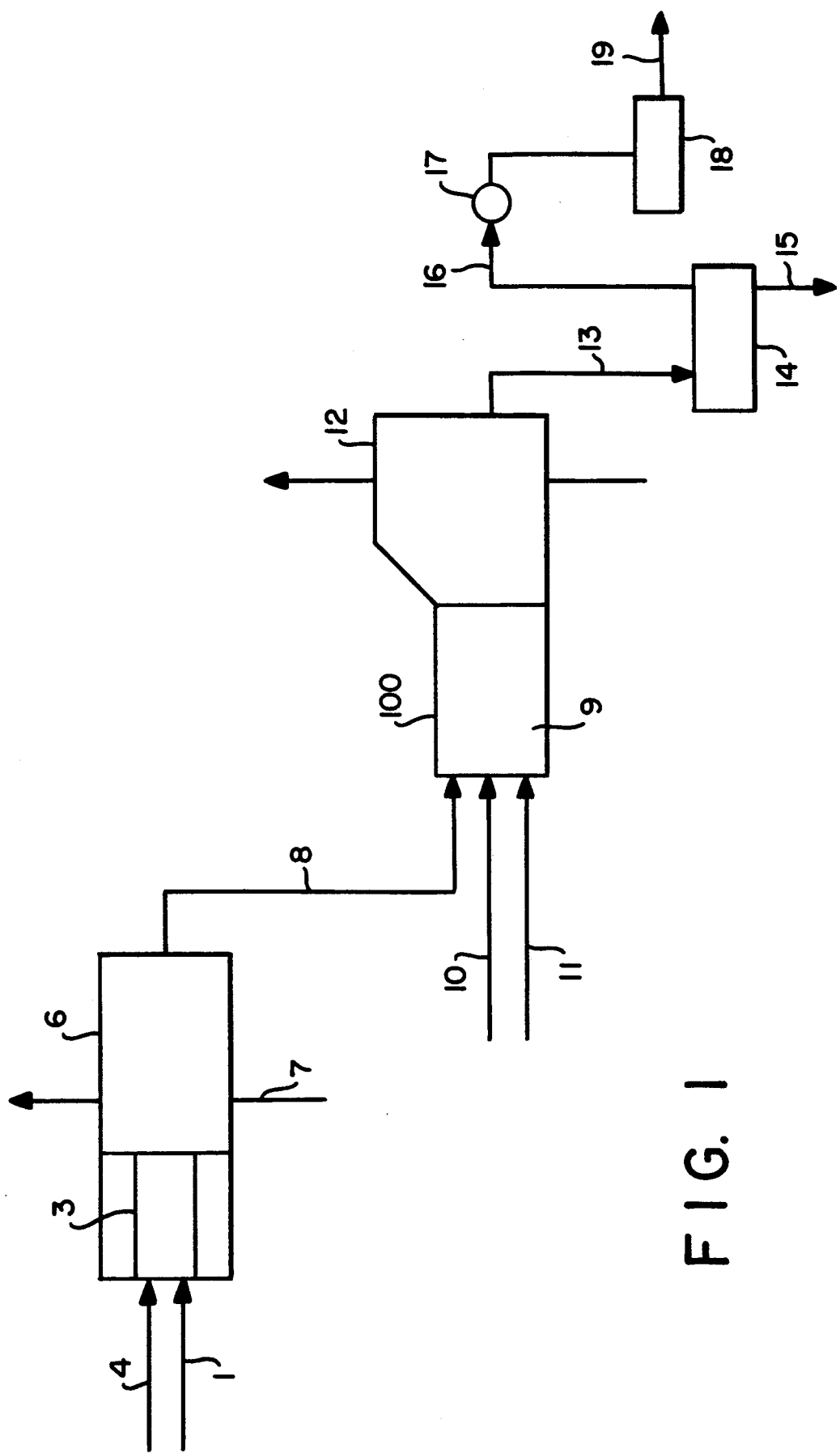
FIG. 1 is a simplified schematic flow diagram of one preferred embodiment of the process of this invention.

Referring now to FIG. 1, feed gas 1 containing ammonia and hydrogen sulfide is passed into first combustion zone 3 which is defined by a heat conducting enclosure and externally cooled as will be discussed more fully later. First feed gas 1 generally contains from about 20 to 50 mole percent ammonia; the balance being hydrogen sulfide, water and possibly some carbon dioxide. Generally the concentration of hydrogen sulfide exceeds 20 mole percent. One common source of first feed gas 1 is the gas effluent from a sour water stripper in a petroleum refinery. The composition of such a sour water stripper gas varies typically around equal proportions of ammonia, hydrogen sulfide and water, with some carbon dioxide if such is present.

First oxidant 4 is also passed into first combustion zone 3, as a separate stream from first feed gas 1. Oxidant 4 may be oxygen-enriched air having an oxygen concentration of at least 90 percent, or technically pure oxygen. As used herein "technically pure oxygen" means an oxidant having an oxygen concentration of at least 99 percent. The advantages of the process of this invention are most noticeable when the oxidant is technically pure oxygen.

First oxidant 4 is added to first combustion zone 3 in an amount which is less than the stoichiometric amount required for the complete combustion of the combustibles within first feed gas 1. First oxidant 4 is added to first combustion zone 3 in an amount sufficient to produce a flame temperature within first combustion zone 3 high enough to completely destroy all of the ammonia in first feed gas 1 but in an amount insufficient to form substantial amounts of nitrogen oxides at that temperature. Generally the maximum temperature is kept within the range of 2800° F. to 3200° F. The destruction of the ammonia at high flame temperatures is made possible without damage to the combustor by conducting the combustion reactions in an externally cooled combustion zone.

Figure 2:
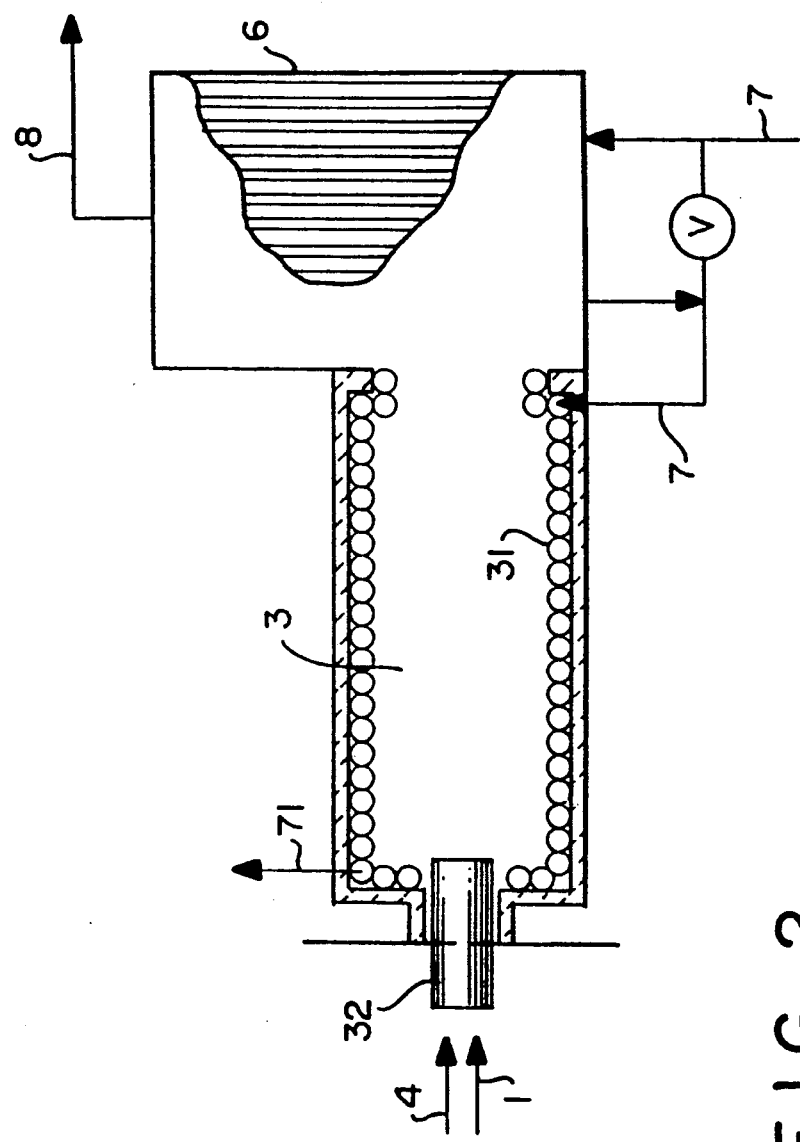
FIG. 2 is a cross-sectional representation of one preferred embodiment of the first combustion zone useful with the invention. The like numbered elements of the figures are the same.

FIG. 2 illustrates one preferred embodiment of first combustion zone 3 useful for destroying ammonia according to the process of the present invention. First combustion zone 3 is provided with heat conducting metal tubes 31 arranged in such a fashion as to define the length/diameter ratio of first combustion zone 3 within the range of from 1.5 to 6, preferably within the range of from 2 to 4. First oxidant 4 is introduced into combustion zone 3 separately from first feed gas 1 preferably through post-mix burner 32 at a velocity at least 300 ft/sec, preferably at a velocity higher than 500 ft/sec. Preferably the oxidant velocity and momentum is sufficient to cause recirculation of combustion reaction products within the first combustion zone. The recirculation within the first combustion zone facilitates heat transfer from the combustion reaction products to the external coolant.

External coolant 7, such as water or steam, is passed through metal tubes 31 to provide protection for the combustion unit by extracting heat from the hot combustion products. At least 25 percent, preferably at least 40 percent, of the heat released by the combustion reactions is extracted from the combustion reaction products before the products leave first combustion zone 3. Coolant 7 can be introduced into metal tubes 31 in any conventional way. A preferred embodiment is illustrated in FIG. 2, wherein the coolant effluent of heat exchanger section 6 is used to cool combustion zone 3. Coolant 7 can be recovered from the cooling circuit of combustion zone 3 as high quality steam 71.

The combustion reaction products formed within combustion zone 3 are substantially free of ammonia and nitrogen oxides and generally include steam, hydrogen, nitrogen, sulfur dioxide, hydrogen sulfide and gaseous sulfur. By "substantially free" it is meant less than about 5 parts per million volume.

Referring back to FIG. 1, the combustion reaction products are then passed into heat exchange section 6 wherein the combustion products are further cooled by indirect heat exchange with external coolant 7. Preferably, the combustion products are introduced without auxiliary piping directly into heat exchange section 6 so that combustion zone 3 with its cooling circuit and heat exchange section 6 can be constructed as a single unit as illustrated in both Figures. The temperature of the cooled combustion reaction products is preferably kept above the dew point of sulfur to avoid gas-conveying difficulties in line 8 due to the condensation of sulfur. Alternatively, the combustion reaction products may be cooled to a temperature below the sulfur dew point, in which case however, a drainage for liquid sulfur should be provided, or a sulfur condenser installed downstream of heat exchange section 6 (not shown in the Figure).

Cooled stream 8 is passed into second combustion zone 9 which is the combustion zone of Claus reaction furnace 100. Also introduced into combustion zone 9 is second feed stream 10 which may be introduced separately into combustion zone 9, as shown in the Figure, or precombined and introduced together with stream 8 into combustion zone 9.

Second feed stream 10 contains substantially no ammonia and is typically an acid gas effluent of an amine plant in a petroleum refinery. The main constituents of second feed stream 10 are hydrogen sulfide, carbon dioxide, steam, hydrogen, and eventually some hydrocarbons, such as methane. The advantages of the process of this invention are particularly noticeable when second feed stream 10 contains more than about 50 mole percent hydrogen sulfide and feed stream 1 is superimposed on the processing rate of second feed stream 10 in a fully loaded Claus plant. By "fully loaded" it is meant that the full flow capacity of the plant is utilized when processing feed stream 10 with air in the absence of feed stream 1.

The third gas stream introduced into a second combustion zone 9 is second oxidant 11. Oxidant 11 is introduced in an amount sufficient to combust a required fraction of the hydrogen sulfide to sulfur dioxide to produce a hydrogen sulfide/sulfur dioxide ratio of about 2 for the Claus reaction after all other combustibles entering second combustion zone 9 are fully combusted. These combustibles may include hydrogen and hydrocarbons but substantially no ammonia, since ammonia is completely combusted in first combustion zone 3. Consequently, no oxidant needs to be allocated for the combustion of this compound in second combustion zone 9. Furthermore, less than one-third of the hydrogen sulfide entering combustion zone 9 needs to be combusted to arrive at the required Claus stoichiometric ratio of hydrogen sulfide/sulfur dioxide of about 2, because some of the sulfur dioxide needed for the Claus reaction is supplied in feed stream 8.

The precombustion of the ammonia and hydrogen sulfide-containing gas 1 reduces the oxidant requirement and the heat generation in combustion zone 9. Consequently, the oxygen concentration in oxidant 11 can exceed that of air without generating excessive temperatures in combustion zone 9. By keeping the oxygen concentration high in both oxidant 4 and oxidant 11, the gas processing capacity of the plant is increased due to a reduction of the unproductive nitrogen flow through the plant. The advantages of the process of this invention are most noticeable when the oxygen concentration in oxidant 11 exceeds that of air.

The uncombusted fraction of the hydrogen sulfide progressively reacts with sulfur dioxide in reaction furnace 100 producing sulfur and steam according to the well known Claus reaction. The hot reaction stream is passed to waste heat boiler 12 where the stream is cooled to a temperature which is generally above the dew point of sulfur.

The cooled reaction stream 13 emerging from waste heat boiler 12 comprising mainly steam, carbon dioxide, gaseous sulfur and some still unconverted sulfur compounds is passed to sulfur condenser 14 for the recovery of sulfur product 15 by condensation.

The gas effluent 16 of sulfur condenser 14 is reheated in gas reheater 17 and is passed through at least one catalytic converter 18 to promote the conversion of the remaining sulfur compounds to sulfur at high catalyst activity, unimpaired by ammonia compounds. Sulfur is recovered from effluent 19 of converter 18 and in the subsequent catalytic stages conventionally and thus the process needs no further discussion.

The following example is derived from a computer simulation and serves to further illustrate the process of the invention. The example is presented for illustrative purposes and is not intended to be limiting.

EXAMPLE

A Claus sulfur recovery plant has a maximum design flow capacity of 190 pound moles per hour (lb mol/hr) at the exit of the first sulfur condenser and employs two downstream catalytic stages after this sulfur condenser.

The maximum temperature which the refractories in the reaction furnace can tolerate without incurring significant damage is 2720° F.

The plant processes 50 lb mol/hr of acid gas feed having a composition of 63 mole percent hydrogen sulfide, 11.8 mole percent water, 20.8 mole percent carbon dioxide, 4.0 mole percent propane, 0.2 mole percent butane and 0.2 mole percent oxygen. The feed is combusted with 116.3 lb mol/hr of air. The adiabatic flame temperature in the combustion zone of the reaction furnace is 2412° F. The gas output of the first sulfur condenser is 158 lb mol/hr.

It is desired to process sour water stripper gas in this Claus plant in addition to the 50 lb mol/hr acid gas feed. An increase in the acid gas processing rate of the plant is also desirable. The sour water stripper gas has a flowrate of 30 lb mol/hr and a composition of 37.5 mole percent ammonia, 37.6 mole percent hydrogen sulfide and 24.9 mole percent water.

In order to process this sour water stripper gas in the Claus plant for sulfur recovery, the ammonia within the stripper gas must be completely combusted or else the downstream catalytic stages will be prematurely deactivated.

If the 30 lb mol/hr sour water stripper gas and the 50 lb mol/hr acid gas were supplied together to the reaction furnace and the combined feed were partially combusted according to the stoichiometric requirement of the Claus reaction with about 180 lb mol/hr air, a maximum combustion temperature of only 2479° F. would be reached in the combustion zone. Furthermore, the gas flow from the first sulfur condenser would be about 252 lb. mol/hr. At the low combustion temperature and at the unfavorable kinetic conditions prevailing in the combustion zone, the ammonia could not be reassuringly destroyed and the maximum design flow capacity of the plant would be significantly exceeded.

According to the process of the present invention, the 30 lb mol/hr sour water stripper gas is passed to an externally cooled first combustion zone such as is illustrated in the Drawings, wherein it is combusted with 9.55 lb mol/hr of technically pure oxygen. The adiabatic flame temperature is 1318° F. which is sufficiently high to destroy essentially all the ammonia but not so high as to cause the formation of nitrogen oxides at the 9.55 lb mol/hr oxygen supply rate. At this temperature the gas composition corresponds to about 4.5 percent hydrogen sulfide, 48.8 percent water, 22.9 percent hydrogen, 12.0 percent nitrogen, 4.0 percent sulfur dioxide, and 7.8 percent diatomic sulfur on an undissociated basis, and is substantially free of ammonia and nitrogen oxides. About 45 percent of the heat of combustion is extracted from the combustion products by indirect heat exchange with water as the external coolant before the gases leave the first combustion zone. The extracted heat is recovered as high pressure steam.

The combustion reaction products are then passed into a heat exchange section and cooled by indirect heat exchange with cooling water to a temperature of 650° F, which exceeds the sulfur dew point. The cooled combustion reaction products leaving the heat exchanger at a rate of about 42 lb mol/hr are combined with 65 lb mol/hr of the acid gas and the combined feed is passed into a second combustion zone which is the combustion zone of the Claus reaction furnace. The combined feed is combusted with 87.7 lb mol/hr of oxidant having an oxygen concentration of 41 mole percent, whereby an adiabatic temperature of 2696° F. is reached. Hydrogen sulfide is partially combusted and all other combustibles are completely combusted in the process. The remaining hydrogen sulfide reacts with sulfur dioxide producing gaseous sulfur according to the Claus reaction in the reaction furnace.

The reaction stream of the reaction furnace is cooled to 620° F. in the waste heat boiler and then is passed to the first sulfur condenser. The sulfur product is separated from the gas by condensation and is collected. The gas leaves the first sulfur condenser at a rate of 182 lb. mol/hr and contains hydrogen sulfide and sulfur dioxide at a ratio close to 2.

The reaction stream is passed through the two catalytic stages of the plant for further sulfur production and recovery. There is no premature deterioration in the activity of the catalyst employed in the catalytic converters and the process lines remain free from deposits of ammonia compound. Furthermore, the acid gas processing rate of the Claus plant has been increased from 50 to 65 lb mole/hr. This 30 percent increase in the acid gas processing rate, coupled with the simultaneous recovery of sulfur from the ammonia-containing feed, demonstrates the benefits offered by the invented process for Claus plants which benefits can be attained within the hydraulic and temperature limitations of the plant and without endangering catalyst life.

Now, by the use of the process of this invention, one can beneficially process an ammonia-containing sour gas in combination with an acid gas feed without encountering operating problems within the Claus plant. Although the process of this invention has been described in detail with reference to certain embodiments, those skilled in the art will recognize that there are other embodiments within the spirit and scope of the claims.

I claim:

1. A process for producing sulfur comprising:
   (A) introducing a first feed gas containing ammonia and hydrogen sulfide into a single unit comprising (1) a first combustion zone having a heat conducting enclosure suitable for extracting heat by an external coolant passing through heat conducting metal tubes surrounding the first combustion zone and (2) a heat exchanger section without auxiliary piping therebetween;
   (B) introducing less than a stoichiometric amount of first oxidant containing at least 90 percent oxygen into the first combustion zone at a high velocity sufficient to cause recirculation of combustion reaction products within the first combustion zone;
   (C) combusting substantially all of the ammonia and part of the hydrogen sulfide in said first feed gas with the first oxidant within the first combustion zone to produce combustion reaction products substantially free of ammonia and of nitrogen oxides, while extracting at least 25 percent of the heat generated by this combustion by heat transfer from the combustion reaction products to the metal tubes surrounding the first combustion zone;
   (D) passing the combustion reaction products from the first combustion zone directly into the heat exchanger section without passing through auxiliary piping, and withdrawing from the combustion reaction products in the heat exchanger section sufficient heat to reduce the temperature of the combustion reaction products to a temperature below the sulfur dew point;

(E) introducing combustion reaction products, second oxidant and second feed gas containing hydrogen sulfide but containing no ammonia into a second combustion zone;

(F) partially combusting hydrogen sulfide with second oxidant in the second combustion some to produce sulfur dioxide;

(G) reacting sulfur dioxide and hydrogen sulfide to produce sulfur;

(H) recovering sulfur as product; and (I) passing unreacted sulfur dioxide and hydrogen sulfide to at least one catalytic reaction zone for further production of sulfur.

2. The process of claim 1 wherein said first feed gas has an ammonia concentration within the range of from 20 to 50 mole percent.

3. The process of claim 1 wherein said first feed gas has a hydrogen sulfide concentration greater than 20 mole percent.

4. The process of claim 1 wherein combustion in the first combustion zone is carried out at a temperature equal to or less than 3200° F.

5. The process of claim 1 wherein the second oxidant has an oxygen concentration exceeding that of air.

6. The process of claim 1 wherein the second feed gas has a hydrogen sulfide concentration greater than 50 mole percent.

7. The process of claim 1 wherein the combustion within the second combustion zone is carried out at a temperature which is below the temperature at which significant refractory damage occurs.

8. The process of claim 1 wherein less than one-third of the hydrogen sulfide introduced into the second combustion zone is combusted.

9. The process of claim 1 wherein at least 40 percent of the heat generated within the first combustion zone is extracted from the first combustion zone by the indirect heat exchange between the combustion reaction products and the external coolant.

10. The process of claim 1 wherein the external coolant is water.

11. The process of claim 1 wherein the combustion reaction products from the first combustion zone are further cooled by indirect heat exchange, and the coolant employed to carry out this further cooling is employed as the external coolant of the first combustion zone.

12. The process of claim 1 wherein the first oxidant is introduced into the first combustion zone at a velocity of at least 300 feet per second.

13. The process of claim 1 wherein heat from the cooling of the combustion reaction products is employed to produce steam.

* * * * *

UNITED STATES PATENT AND TRADEMARK OFFICE
CERTIFICATE OF CORRECTION

PATENT NO. : 5,139,764
DATED : August 18, 1992
INVENTOR(S) : A. G. Szekely It is certified that error appears in the above-identified patent and that said Letters Patent is hereby corrected as shown below:

Col. 9, claim 1, line 6, delete "some" and Insert --zone--.

Signed and Sealed this

Twenty-fourth Day of August, 1993

Attest:

BRUCE LEHMAN

*Attesting Officer*   *Commissioner of Patents and Trademarks*